UNITED STATES PATENT OFFICE.

THOMAS T. GAFF, OF BARNSTABLE, MASSACHUSETTS, AND JOSEPH F. GENT, OF INDIANAPOLIS, INDIANA; SAID GENT ASSIGNOR OF ONE-THIRD OF HIS RIGHT TO SAID GAFF.

TREATMENT OF MAIZE FOR THE PRODUCTION OF GRITS, FLAKES, &c.

SPECIFICATION forming part of Letters Patent No. 707,059, dated August 12, 1902.

Application filed April 23, 1902. Serial No. 104,387. (No specimens.)

*To all whom it may concern:*

Be it known that we, THOMAS T. GAFF, of Barnstable, in the county of Barnstable and State of Massachusetts, and JOSEPH F. GENT, of Indianapolis, in the county of Marion and State of Indiana, have invented a new and useful Improvement in the Treatment of Indian Corn for the Production of Corn-Milling Products, of which the following is a specification.

The process of treating Indian corn which we have devised is intended to secure as far as possible the separation of the starchy from the oleaginous parts of the grain.

The process involves, generally speaking, the steps of coarsely breaking the corn and separating out the starchy portions from the germ and hulls as far as possible by sifting and winnowing, then further comminuting the residue consisting of a mixture of starchy and oil-bearing material, then treating this comminuted residue with a solvent for the extraction of its contained oil, then freeing the deoiled residue from all traces of the solvent employed, then recovering from the residue the starchy portions thereof by sifting and winnowing, then adding to said recovered starchy matter an agglutinating material, and finally moistening and rolling the mixture. The agglutinating material which is added may consist of the purer starchy matter obtained after the first coarse breaking. It is added to reinforce the glutinous principle which may have been removed in part or the adhesive properties of which may have been impaired by the "extraction" treatment, and when added to the deoiled starch-bearing residue and moistened and mixed therewith the resultant material can readily be manufactured into flakes, for which purpose the apparatus set forth in Letters Patent, No. 395,893, of January 8, 1889, is well adapted.

Under the old methods of corn-milling a large portion of the grist—some twenty pounds per bushel of grain—is left such a mixture of starchy and oil-bearing material as to be fit only for "feed;" but under our invention this loss is materially lessened and the starch-bearing portion of the residue is largely saved. This starch-bearing material may, it is true, still be mingled with more or less germ particles; but as the oil is absent in great part therefrom the material will be available for uses other than as feed and can readily be manufactured into flakes in the manner hereinbefore indicated.

We now proceed to describe more particularly the manner in which our invention is or may be carried into effect.

We prefer at the outset to preliminarily moisten the corn to such an extent only as to toughen it and promote easier hulling without, however, destroying the structural adhesion of the grain, as described, for example, in the patent of Joseph F. Gent, No. 302,198, of July 15, 1884. The grain is then coarsely ground or broken, for which purpose it may be subjected to a series of crushings in the so-called "degerminating" apparatus, alternating with winnowing and siftings, the winnowing being for the purpose of taking out and carrying off the hulls and light material and the siftings being for the purpose of separating out as far as possible the germs from the starch-bearing portions of the grain. This series of operations and the apparatus used therein are well known to those skilled in the art and require no further description. As a result of this step and after the starch portions of the grain have been separated out as far as possible there remains a residue composed of a mixture mainly of germ or oil-bearing and starchy particles. This residue is then by the use of known apparatus still further comminuted. This being mainly for the purpose of breaking up the oil-cells and reducing the thickness of the material, the solvent used in the next succeeding step must penetrate in order to extract the oil. The next step is to subject the thus-comminuted residue to the action of a solvent—such, for example, as naphtha—in order to extract the oil therefrom, after which the deoiled residue is purged or freed from all traces of the solvent employed. Apparatuses for this purpose, whereby the meal or other material is subjected to the action of a highly-volatile solvent, such as naphtha, for the extraction of its contained oil and is then subsequently treated so as to purge it of the solvent, are well known to those skilled in the art to which our invention relates and require no description here. Apparatus for this purpose is set forth, for example, in expired Patents Nos. 248,343 and 245,274, among others. The deoiled and purified residue is then winnowed and sifted, so as to separate out as far as possible the starch-bearing portions thereof. The starchy material thus recovered from the residue will still be mingled with a percentage of germ particles, and the starchy material itself, owing to its treatment with the solvent, will have lost to a greater or less extent its gluten—the adhesive property which fits it for subsequent manipulation into flakes; but as the oil—the chiefly-objectionable matter—is absent in great part the germ particles are not detrimental and the material can be given the proper quality, so far as adhesive property is concerned, by adding to and mixing with the mass in suitable proportion some agglutinating substance. For this purpose we prefer to use the starchy matter obtained from the first coarse breaking of the degerminated grain or corn. There is a certain percentage of meal which is obtained from the first separation after the crushing, and this meal can be used for the purpose in question with excellent results. The quantity of the agglutinating material added to the recovered starchy residue may vary within wide limits. We find that good results can be obtained by mixing the two in the proportion of one-fourth to one-third of fresh meal to three-fourths to two-thirds of the recovered material. The thus-prepared mixture is then moistened and rolled into flakes. An apparatus well adapted for this purpose, wherein the mass is steamed, moistened, thoroughly mixed and macerated, and then passed between compression-rollers, by which it is rolled into flakes, is described in Gent's patent, No. 395,893, of January 8, 1889.

Having now described our invention and the manner in which the same is or may be carried into effect, what we claim herein as new, and desire to secure by Letters Patent, is—

1. The hereinbefore-described improvement in the treatment of Indian corn for the production of corn-milling products, consisting in coarsely breaking the corn, separating out the starchy portions as far as possible by sifting and winnowing, further comminuting the residual mass of mixed germ and starchy matter, subjecting the thus-comminuted residue to the action of a solvent whereby the oil is removed therefrom, purging the thus-deoiled residue from all traces of the solvent, separating out as far as possible by sifting and winnowing the starchy portions from the remainder of the thus-purified residue, adding to and mixing with the thus-separated-out starchy matter an agglutinating material, and finally moistening and rolling the thus-prepared mixture, substantially as set forth.

2. In the treatment of Indian corn for the production of corn-milling products, the process of making flaked corn from the comminuted residual mixture of starchy and oil-bearing material known as "feed" which consists in subjecting said residue to the action of a solvent to extract and remove the oil as far as possible therefrom, then purging the thus-deoiled residue from all traces of the solvent, then separating out as far as possible the starchy particles from the remainder of the thus deoiled and purified residue, then adding to and mixing with the thus-recovered starchy matter an agglutinating material, and finally moistening the thus-prepared mixture and rolling it into flakes, substantially as hereinbefore set forth.

In testimony whereof we have hereunto set our hands this 9th day of April, 1902.

THOMAS T. GAFF.
JOSEPH F. GENT.

Witnesses:
LULU G. NEMETHY,
FRANZ. C. BOPP.